United States Patent
Karrai et al.

(10) Patent No.: US 6,940,210 B2
(45) Date of Patent: Sep. 6, 2005

(54) INERTIAL ROTATION DEVICE

(75) Inventors: Khaled Karrai, Munich (DE); Miles Haines, Hampshire (GB)

(73) Assignee: attocube Systems AG, Munich (DE)

( * ) Notice: Subject to any disclaimer, the term of this patent is extended or adjusted under 35 U.S.C. 154(b) by 0 days.

(21) Appl. No.: 10/432,193

(22) PCT Filed: Nov. 22, 2001

(86) PCT No.: PCT/EP01/13632
§ 371 (c)(1),
(2), (4) Date: Nov. 4, 2003

(87) PCT Pub. No.: WO02/43162
PCT Pub. Date: May 30, 2002

(65) Prior Publication Data
US 2004/0074300 A1 Apr. 22, 2004

(30) Foreign Application Priority Data
Nov. 23, 2000 (GB) .............................................. 0028511

(51) Int. Cl.[7] .............................................. H01L 41/08
(52) U.S. Cl. ...................................... 310/328; 310/333
(58) Field of Search ...................... 310/323.02, 323.03, 310/328, 330–333

(56) References Cited

U.S. PATENT DOCUMENTS

| | | | | |
|---|---|---|---|---|
| 4,195,243 A | * | 3/1980 | Thaxter | 310/317 |
| 4,455,501 A | | 6/1984 | Tojo et al. | |
| 4,578,607 A | | 3/1986 | Tojo et al. | |
| 4,585,969 A | * | 4/1986 | Tanaka | 310/328 |
| 4,686,440 A | * | 8/1987 | Hatamura et al. | 318/646 |
| 5,079,471 A | | 1/1992 | Nygren, Jr. | |
| 5,237,238 A | | 8/1993 | Berghaus et al. | |
| 5,410,206 A | | 4/1995 | Luecke et al. | |
| 5,705,878 A | * | 1/1998 | Lewis et al. | 310/328 |
| 6,136,201 A | * | 10/2000 | Shah et al. | 210/739 |
| 6,359,370 B1 | * | 3/2002 | Chang | 310/328 |

FOREIGN PATENT DOCUMENTS

| | | |
|---|---|---|
| EP | 464 764 A1 | 1/1992 |
| EP | 675 589 A1 | 10/1995 |
| EP | 747 977 A1 | 12/1996 |
| GB | 2 316 222 A | 2/1998 |
| JP | 6-261559 | 9/1994 |
| WO | WO 98/19347 | 5/1998 |
| WO | WO 00/54004 | 9/2000 |

OTHER PUBLICATIONS

Eng L.M. et al., "Inexpensive, reliable control electronics for stick–slip motion in air and ultrahigh vacuum", Review Of Scientific Instruments, vol. 67, No. 2, Feb. 1996, pp. 401–405, XP002197710.

Zesch W. et al., "Inertial Drives for Micro– and Nanorobots:Two Novel Mechanisms", Microrobotics And Micromechanical Systems, Philadelphia, PA USA, vol. 2593, 1995, pp. 80–88.

Yakimov V., "Scanning tunneling microscope with a rotary piezoelectric stepping motor", Review of Scientific Instruments, vol. 67, No. 2, Feb. 1996, pp. 384–386.

(Continued)

*Primary Examiner*—Mark Budd (57) ABSTRACT

An inertial positioning device comprising: a base plate (10); a top plate (20) for mounting an element to be rotated; a rotation member (16) having a column (18) on which the top plate is mounted in frictional engagement for slip-stick rotational motion; and a pair of piezoelectric actuators (12) each secured to the base plate at one end and to lateral extensions (17) of the rotation member at their other ends. Simultaneous actuation of the piezoelectric actuators rotates the column of the rotation member about its axis. When a suitable asymmetric drive signal is supplied to the piezoelectric actuators, the top plate is rotated by slip-stick motion. The device is compact, has a good load capacity for an inertial motor and is operable in extreme environments such as liquid helium temperatures, high vacuum and high magnetic fields.

25 Claims, 7 Drawing Sheets

OTHER PUBLICATIONS

Howald L. et al., "Piezoelectric inertial stepping motor with spherical rotator" Review Scientific Instruments, vol. 63, (1992), pp. 3909–3912.

Renner et al., "A vertical piezoelectric inertial slider", Review Scientific Instruments, vol. 61, (1990), pp. 965–967.

* cited by examiner

INERTIAL ROTATION DEVICE

BACKGROUND OF THE INVENTION

The invention relates to devices for rotating an object about an axis, more especially to rotation devices that operate by the principle of inertial slip-stick motion.

Rotational positioning devices are in widespread use in diverse industrial and scientific applications. Applications that use rotational positioners include: various forms of microscopy, including scanning probe microscopy, optical microscopy and electron microscopy; sample handling during semiconductor processing; a variety of vacuum applications, including ultra-high-vacuum (UHV) applications; rotation of objects in a magnetic field generated by a conventional or superconducting magnet; and a variety of applications related to rotating samples or other components inside cryostats, including magnet cryostats.

Rotational positioning devices may be based on a number of different classes of design. For example, the devices may be based on stepper motors. Another class of designs, which is used for camera auto-focus applications, is based on ultrasonic motors. A further class of designs, to which the present invention belongs, is based on inertial motors. A known rotational positioner based on an inertial motor is now described.

Figure 1A:
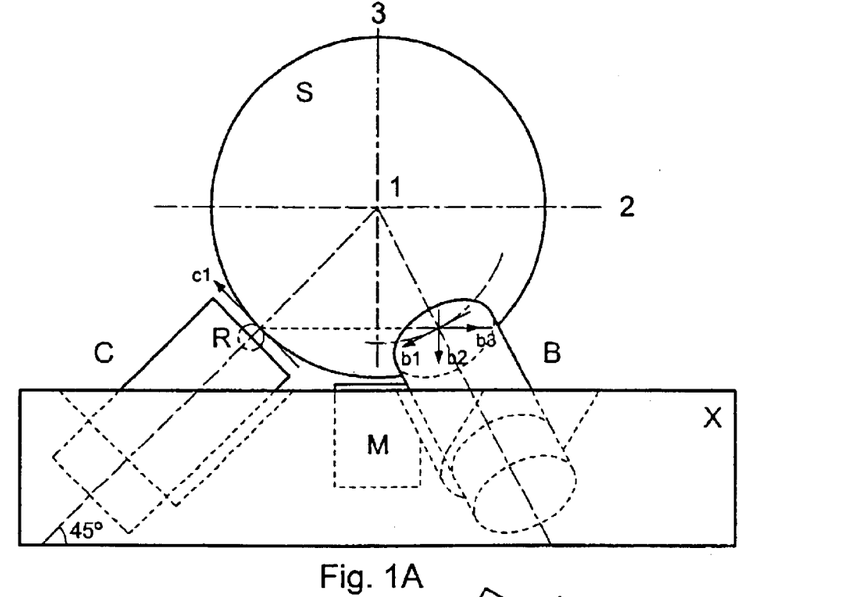
FIGS. 1A and 1B show side and plan views of a prior art inertial rotation device.
Figure 1B:
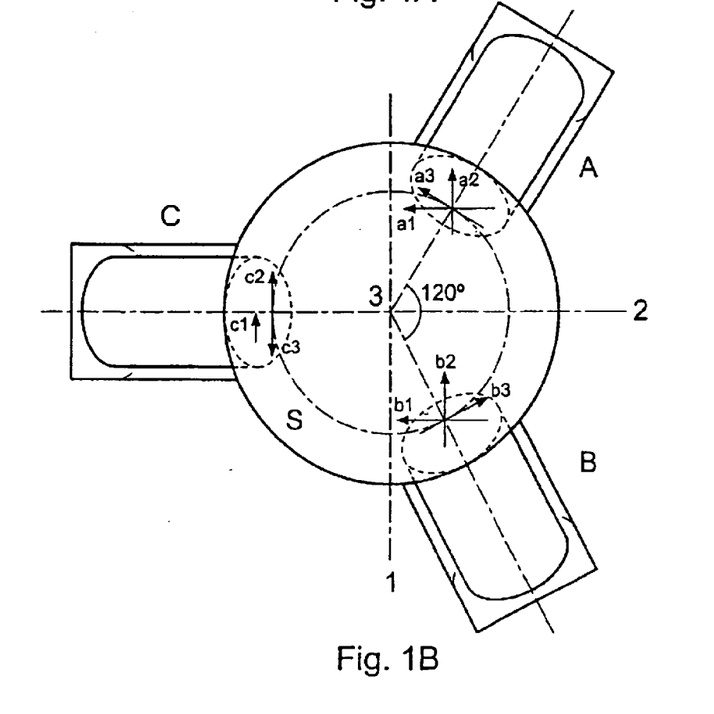

FIGS. 1A and 1B of the accompanying drawings shows an inertial rotational positioner as described in reference [1]. A polished steel sphere S lies on three piezoelectric actuators A, B and C which are fixed to a common base plate X. The sphere constitutes the movable, i.e. rotatable, part of the positioner. For achieving a small and well-defined contact area between the actuators and the steel sphere, a glass or ruby ball R is fixed at the end of each actuator. A magnet M is fixed to the base plate X and arranged to pull down the steel sphere onto the actuators by a magnetic force of five to ten times the weight of the sphere S. This clamping force allows the motor to generate larger torques, as will be understood from general principles of slip-stick motion. The device is capable of providing three rotational axes 1, 2 and 3.

To achieve a small amount of rotation about axis 1, 2 or 3, each actuator has to contribute an appropriate tangential component. The directions of these components are drawn as arrows in the figures, and labelled a1, b1 and c1 for the respective actuators A, B and C. To rotate the sphere S, the piezoelectric actuators are actuated in bending mode with the bending direction being specific to the desired rotation direction. The amount of displacement, that is the size of the bending, must also be chosen correctly. Each positioning step is composed of two events. First a slow bending of all actuators simultaneously in the directions of arrows a1, b1, c1 and then an abrupt jump back of the actuators to their original straight alignment. During the slow bending, the sphere follows the actuators by friction, whereas during the abrupt jump back the sphere cannot follow the actuators because of its inertia. The actuators thus return to their original straight alignment under slippage between the actuators and the sphere. These two events are the "stick" and "slip" phases that typify any inertial or "slip-stick" motor. A series of such stick and slip steps can thus be used to rotate the sphere about axis 1, 2 or 3 through a desired angle.

This design has been used to control a mirror mounted on the sphere in a galvanometric system to detect cantilever deflection in an atomic force microscope. The design is UHV compatible.

The prior art design does however have some limitations. Like all inertial positioners, step size is not very reproducible and is load dependent. In a prior art linear inertial positioner, such as described in reference [2], variation in step size does not compromise the geometry, i.e. direction, of the motion, only the magnitude of the motion. Although not desirable, this variation in the magnitude of the motion in the design of reference [2] can be compensated for by some kind of feedback. However, in the design of reference [1], the step size fluctuations that are inevitable in an inertial positioner will result in wandering of the axis of rotation. In other words, the step size fluctuations will not only result in the angular displacement deviating from the desired magnitude, but also in the geometry of the rotational motion being inaccurate. This is more difficult to compensate for than a variation in the magnitude of the motion. The problem may be viewed as being a result of the fact that, in the design of reference [1], there is no one-to-one correspondence between the three actuators and the three rotational axes. This limitation is inherent to the design, since it follows from the sphere's geometry.

The drive electronics needed for implementing the design of reference [1] are also relatively complicated, since the three actuators need to be supplied with separate drive signals that are carefully co-ordinated. This limitation also follows from the lack of one-to-one correspondence between the actuators and the rotational axes.

Other inertial motor designs are described in reference [3-8].

SUMMARY OF THE INVENTION

According to the invention there is provided an inertial positioning device comprising a base plate; a top plate for mounting an element to be rotated; a rotation member having a column on which the top plate is mounted in frictional engagement for slip-stick rotational motion; and a pair of piezoelectric actuators, each having first and second ends, the first ends being secured to the base plate and the second ends being secured to the rotation member such that simultaneous actuation of the piezoelectric actuators rotates the column of the rotation member about an axis thereof.

In use, it is the rate, more precisely the acceleration, of the piezoelectric deformation of the actuators that determines whether the frictional engagement between the top plate and the column sticks or slips. Slip-stick rotational motion of the top plate can thus be produced by application of a suitable asymmetric drive signal to the piezoelectric actuators. The piezoelectric actuators are supplied with the same drive signal. In practice, this is conveniently achieved by wiring the two piezoelectric actuators in parallel. The functional form required of the drive signal is discussed in detail in reference [2] in the context of linear inertial positioners, but is also applicable to the present rotational inertial positioners.

The piezoelectric actuators preferably suspend the rotation member above the base plate. This feature is highly advantageous for low temperature applications, since contraction, especially differential contraction, that takes place during temperature cycling does not lead to stress fracture of the piezoelectric actuators or jamming of the frictional engagement. In alternative designs, the rotation member need not be suspended, but could be mounted onto the base plate with bearings or bushings.

In one embodiment, suspension of the rotation member is achieved by the piezoelectric actuators being cantilevered out from their first ends to suspend the rotation member by their second ends, wherein simultaneous actuation of the piezoelectric actuators causes lengthwise extension or contraction of the piezoelectric actuators. In this embodiment, the piezoelectric actuators may extend substantially parallel to each other on opposite sides of the column. Other arrangements in which the actuators extend tangentially to the column periphery may also be used.

In another embodiment, suspension of the rotation member is achieved the piezoelectric actuators being arranged under the rotation member, wherein simultaneous actuation of the piezoelectric actuators causes shear deformation thereof.

The piezoelectric actuators are preferably piezoelectric stacks. Stacks are preferred owing to their high Young's modulus. However, piezoelectric tubes or other piezoelectric elements could also be used.

In embodiments of the invention, the column has a cross-section that is at least part circular so that the top plate is free to rotate at least through a limited angular range. In other words, the cross-section is circular or comprises arcuate sections lying on a circle. If the cross-section is circular, the top plate may rotate through one or more full rotations.

The column may be cylindrical, frusto-conical, or a variety of other shapes with circular cross-sections.

The top plate and the column may advantageously be structured and/or arranged to inhibit motion of the top plate along the rotation axis. This can be achieved in many ways. For example, the column may be a simple frusto-conical shape, tapering in the upwards direction. Alternatively, the column may have frusto-conical sections of opposite taper. Another alternative is to provide the column or top plate with an abutment arranged to inhibit motion of the top plate along the rotation axis.

The top plate may comprise first and second parts connected to each other by a resilient biasing mechanism that defines a clamping force for the frictional engagement between the top plate and the column. The resilient biasing mechanism is adjustable to vary the clamping force. This is very useful in practice, since operation of the device can be optimised after assembly by adjusting the clamping force. A simple one-piece top plate could be used, but has the disadvantage that wear would reduce the clamping force characteristic of the frictional engagement. However, a one-piece top plate can avoid this problem by inclusion of a suitable biasing mechanism.

BRIEF DESCRIPTION OF THE DRAWINGS

For a better understanding of the invention and to show how the same may be carried into effect reference is now made by way of example to the accompanying drawings in which.

DETAILED DESCRIPTION

An inertial rotation device according to a first embodiment of the invention is now described with reference to FIGS. 2 to 5.

Figure 2:
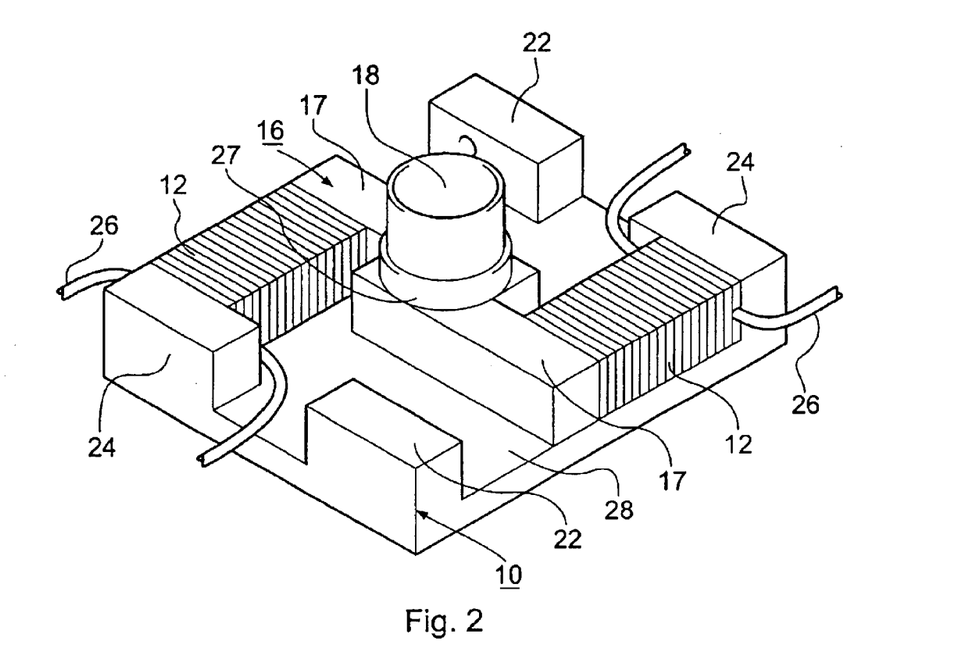
FIG. 2 is a schematic perspective view of an inertial rotation device according to a first embodiment with the top plate removed.
Figure 4:
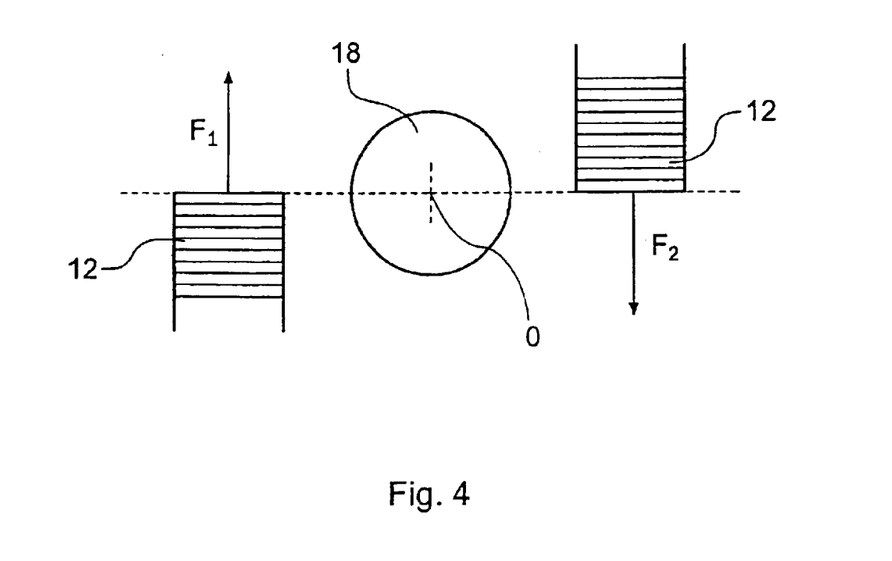
FIG. 4 is a schematic plan view showing operating principles of the first embodiment.
Figure 5:
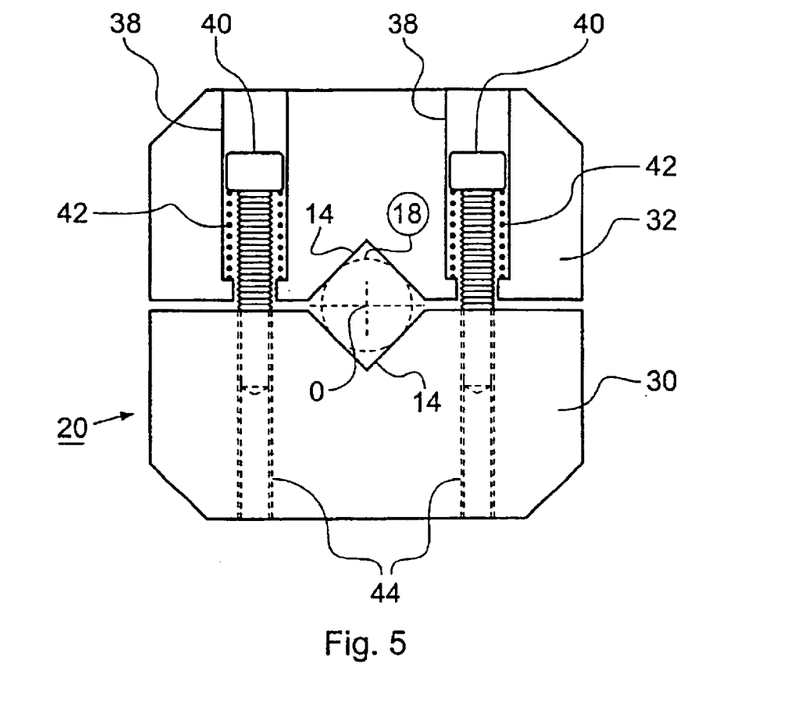
FIG. 5 is a partial section through the top plate of the first embodiment showing its biasing mechanism.

FIG. 2 is a schematic perspective view of the inertial rotation device with its top plate removed to reveal the underlying components. The top plate is shown, also in perspective view, in FIG. 3. FIG. 4 is a schematic diagram illustrating operation of the device. FIG. 5 shows the top plate in section to reveal its biasing mechanism.

The basic components of the device are: a base plate 10 which is to be fixed to a frame of reference; a top plate 20 which is movable, more specifically rotatable; a rotation member 16, having an upstanding column 18; and a pair of piezoelectric actuators 12 that join the rotation member 16 to the base plate 10. The rotation member 16 may be considered as a transmission or drive train for converting linear impulses from the piezoelectric actuators 12 into rotation of the top plate 20.

Figure 3:
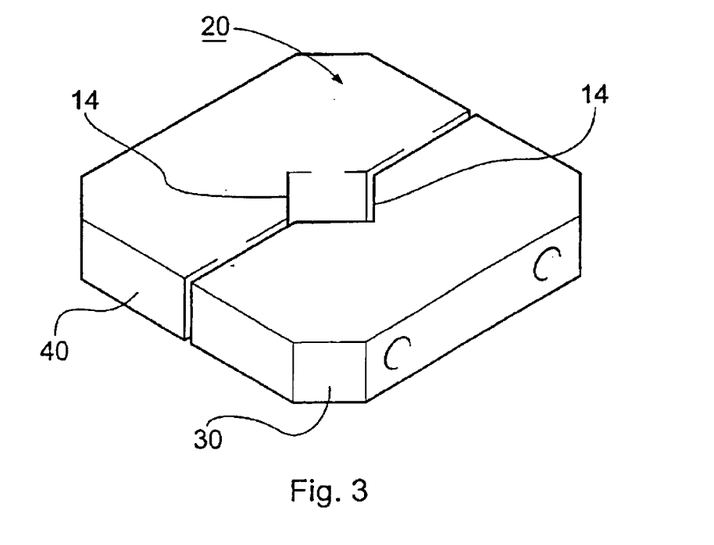
FIG. 3 is a schematic perspective view of the top plate for the first embodiment.

The top plate 20 is in two parts 30 and 40 connected to each other by a resilient biasing mechanism which is not evident in FIG. 3, but is shown in FIG. 5. With reference to FIGS. 2 and 3, final assembly of the device can take place by fitting the top plate 20 onto the column 18 and sliding it down to but against a lip formed between the outer cylindrical surface of the column and a larger diameter stub 27 which forms a lower continuation of the column. The lip thus acts as an abutment that inhibits the top plate 20 from sliding down the column 18 during operation. The two top plate parts 30 and 40 have mutually facing V-grooves 14 that together form a space into which the column 18 is received. The two parts 30 and 40 clamp via their V-grooves 14 onto the column 18 by a clamping force generated by the resilient biasing mechanism. This clamping action provides a defined frictional engagement between the top plate 20 and the column 18.

In the present embodiment, the piezoelectric actuators 12 are in the form of piezoelectric stacks. The benefits of using stacks in an inertial motor are discussed in detail in reference [2]. In short, stacks are stiffer, i.e. have a larger Young's modulus, than tubes which is important for good performance. Each stack has a pair of electrical leads 26 for receiving an actuation signal. The two pairs of leads 26 are wired in parallel (not shown) and receive a common drive signal from an external pulse generator (not shown). The parameters required of the drive signal for an inertial motor are described in detail in reference [2]. The discussions in reference [2] are applicable in the present case, notwithstanding the fact that reference [2] is concerned exclusively with linear, rather than rotational, inertial positioners.

Each piezoelectric actuator 12 is secured at one end to the base plate 10 and at the other end to the rotation member 16. This is achieved by adhesive bonding with an epoxy resin. For this purpose, the base plate is provided with flanges 24 that form upstanding extensions from the main part of the base plate. The flanges 24 have inner surfaces to which the piezoelectric actuators 12 are each bonded at one end. The piezoelectric actuators are bonded at their other ends to respective facing flat surfaces of the rotation member 16.

Further flanges 22 are also provided in the base plate 10. These further flanges 22 have threaded through-holes (visible in one of the flanges 22 in FIG. 2) which allow screws (not shown) to be inserted to press the piezoelectric actuators in place during the adhesive bonding process. After bonding, the screws are removed. In the assembled device, the piezoelectric actuators extend horizontally, suspended in a cantilever arrangement slightly above an upper surface 28 of the base plate 10.

The rotation member 16 comprises the upstanding cylindrical column 18 and two lateral extensions 17 which serve to provide respective bonding faces for the piezoelectric actuators 12. The two bonding faces lie in the same plane. Moreover, the cylindrical column is arranged such that the axis of the cylinder lies in the plane of the bonding faces. The axis of the cylinder of the column 18 also forms the rotational axis of the positioner. The above-described geometrical arrangement of the bonding faces relative to the column 18 ensures that simultaneous extension or contraction of the piezoelectric actuators 12 results in no net displacement of the column 18, but rather a pure rotation.

FIG. 4 shows the situation schematically. The two actuators 12 generate respective forces $F_1$ and $F_2$ of equal magnitude and opposite direction, and having lines of action that are equally distanced from the centre axis O of the column 18. The forces $F_1$ and $F_2$ originate from the common plane of the bonding faces, this plane being shown by a dashed line in the figure. Moreover, the forces $F_1$ and $F_2$ are both directed tangential to the circumference of the cylindrical column 18. In the limit of small extension or contraction of the piezoelectric actuators 12, the two simultaneously applied forces $F_1$ and $F_2$ are thus equivalent to a rotational force, i.e. a torque, about the centre axis O of the column 18. Although the present arrangement is considered a simple and effective way to fulfil these requirements, it will be appreciated that other mechanical arrangements of two or more linear piezoelectric actuators can provide a pure rotation of the column 18.

FIG. 5 shows the top plate 20 in section to reveal its biasing mechanism. The first part 30 has two internal threaded through-holes 44 which are arranged to be co-axial with two countersunk bores 38 in the second part 40 for receiving bolts 40. The bolts 40 are threaded into the threaded holes 44 of the first part. The resilient biasing is provided by helical springs 42 arranged in compression between the heads of the bolts 40 and the base of the countersunk bores 38. The clamping force provided by the springs depends on their degree of compression, and can thus be increased and decreased by screwing the bolts 40 into and out of the threaded holes 44. In the figure, the column 18 of the rotation member is shown with a dashed line. As is evident, the two parts 30 and 40 of the top plate 20 clamp onto the column 18 so that the frictional engagement is made up of four lines of contact (extending perpendicular to the plane of the figure), two for each V-groove 14.

EXAMPLE

Some specific parameters are now given for an example device according to the first embodiment. Dimensions: Base plate 20×24×4 mm. Base plate flanges: 7×3.5×4.5 mm, where 4.5 mm is the height dimension, i.e. the height of extension above the upper surface of the base plate. Column height is 6 mm. Column diameter is 5 mm in the upper portion and 6 mm below the abutment lip. The lateral extensions extend 10 mm from the rotation axis of the column and are 3 mm thick and 6 mm high. The piezoelectric actuators are 9 mm long with an area 5×5 mm. The top plate parts 30 and 40 each have external dimensions 24×12×6 mm. The V-groove depths are 3.5 mm and the V-groove angle 90 degrees. The threads and bores are for M2 bolts. The frictional engagement surfaces are coated with molybdenum disulphide, a solid lubricant. The base plate, top plate parts and rotation member are each single pieces of titanium. Titanium is used for its mechanical properties, and owing to it being non-magnetic. The device of this example is operable between liquid helium and room temperature, in high magnetic fields and in high vacuum. The device is dimensioned to fit comfortably into a 1½ inch (38 mm) bore tube, such as a cryostat insert. The device operates with a drive signal having peak-to-peak voltages between 5 and 70 V. The magnitude of the voltage determines the angular step size. In addition, the angular step size is temperature dependent as a result of the temperature dependence of the piezoelectric effect.

The above example is for illustrative purposes only. For example, a variety of materials can be used instead of titanium. One other suitable material is stainless steel. A discussion of the influence of materials' properties on inertial motor performance and a classification of various materials in terms of these properties can be found in reference [2].

Figure 6A:
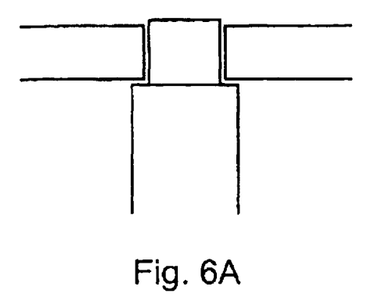
FIGS. 6A to 6G show different options for mounting the top plate.
Figure 6B:
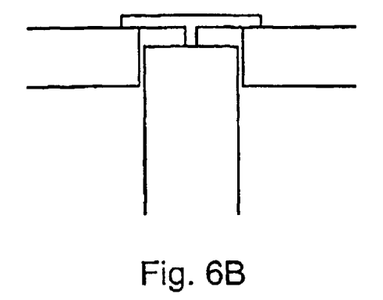
Figure 6C:
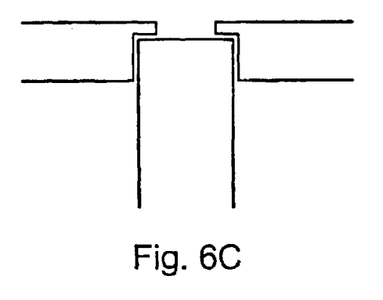
Figure 6D:
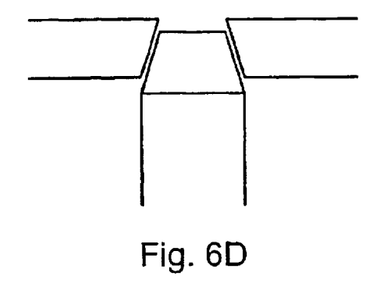
Figure 6E:
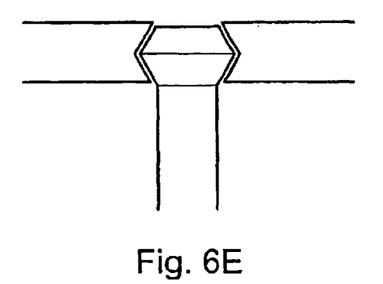
Figure 6F:
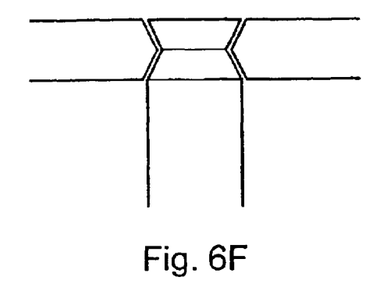
Figure 6G:
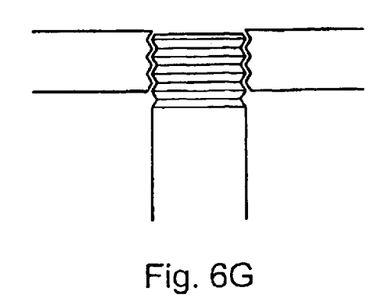

FIGS. 6A to 6G show a number of different designs for the mounting between top plate and column. FIG. 6A shows the design already described in relation to the first embodiment. FIG. 6B shows an arrangement in which a cap is secured on the top plate and arranged in contact with the upper end of the column, preferably over a small surface area to reduce friction that would influence the inertial rotation. FIG. 6C shows a top plate in which each part has a lip extending radially inwards over a small portion of the upper surface of the column. FIG. 6D shows a frusto-conical taper of a portion of the column, with correspondingly shaped top plate surfaces. In this case, V-grooves may be used as in the first embodiment. Alternatively, arcuate recesses in the top plate parts extending over somewhat less than 180 degrees could be used. FIGS. 6E and 6F show arrangements in which the column has two frusto-conical sections of opposite taper. FIG. 6G shows an arrangement with multiple frusto-conical sections, any two adjacent ones of the sections being of opposite taper. The column designs of FIGS. 6E, 6F and 6G are envisaged for use with arcuate recesses in the top plate parts.

Figure 7:
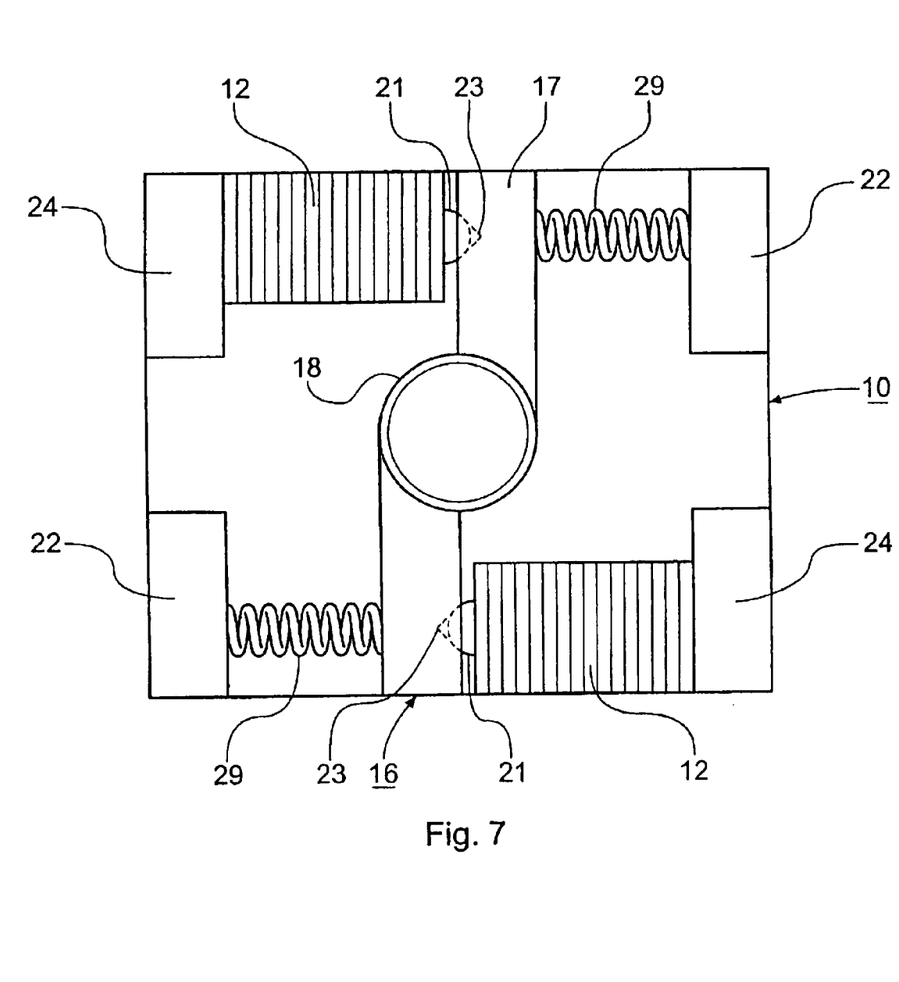
FIG. 7 is a schematic plan view of an inertial rotation device according to another embodiment with the top plate removed.

FIG. 7 shows in plan view an inertial rotation device according to a further embodiment. The figure shows the device with its top plate removed. The top plate is as described above with reference to FIGS. 3 and 5. The overall design will largely be appreciated from the first embodiment. Namely, there is provided: a base plate 10; a rotation member 16, having an upstanding column 18 and lateral extensions 17, and a pair of piezoelectric actuators 12 that join the rotation member 16 to the base plate 10. Each piezoelectric actuator 12 is secured at one end to an inner surface of a flange 24 extending up from the base plate 10. This is achieved by adhesive bonding with an epoxy resin. However, in contrast to the first embodiment, the other ends of the piezoelectric actuators 12 are not bonded to inner surfaces of the lateral extensions 17 of the rotation member 16. Instead, each of the piezoelectric actuators 12 has a ball 21 arranged at its end adjacent to the rotation member 16. Piezoelectric actuators with such a ball mounted at the end are commercially available since they are used for standard optical component gimbal mounts. Each ball 21 is in tangential contact with the surface of a locating recess 23 for the associated ball, for example a conical recess as illustrated. Each piezoelectric actuator 12 is held securely in place at its ball end by biasing with a spring 29 that is arranged in compression between an inner surface of a further flange 22 extending upwards from the base plate 10 and a back surface of the lateral extension 17.

The arrangement of this embodiment has the advantage that there is a more precise point of action of the piezoelectric actuators on the rotation member. More specifically, each piezoelectric actuator acts at a well defined distance from the rotation axis equal to the distance between the point of contact of the ball with the associated lateral extension (see FIG. 4). Any tendency for bending distortion of the piezoelectric actuators that may occur in the first embodiment owing to the relatively large area of contact between the piezoelectric actuators and their associated lateral extensions is thus substantially eliminated. Further, as there is no bonding of the piezoelectric actuators to the rotation member, the rotation member is also easily removed and replaced.

Figure 8:
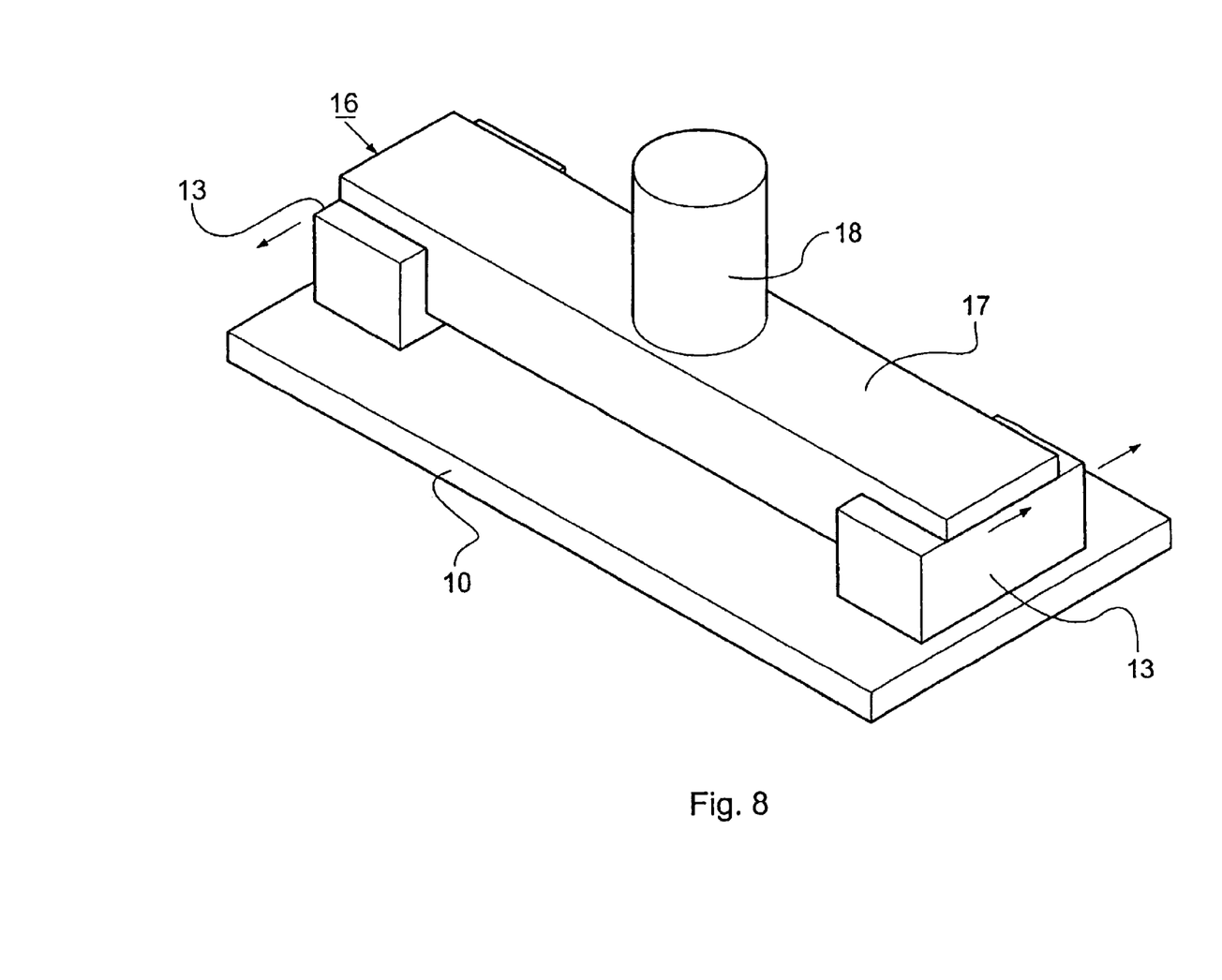
FIG. 8 is a schematic perspective view of an inertial rotation device according to a further embodiment with the top plate removed.

FIG. 8 shows in perspective an inertial rotation device according to a further embodiment of the invention with its top plate removed. The top plate is as described above with reference to FIGS. 3 and 5. There is provided: a base plate 10; a rotation member 16, having an upstanding column 18 and lateral extensions 17, and a pair of piezoelectric actuators 13 that join the rotation member 16 to the base plate 10. The piezoelectric actuators 13 act in shear mode, as indicated by the arrows in the figure. The piezoelectric actuators are arranged under respective lower surfaces of the lateral extensions 17. The rotation member 16 thus rests on the piezoelectric actuators 13, instead of being suspended in a cantilevered arrangement as in the first embodiment. Each piezoelectric actuator is arranged with a lower surface bonded to the base plate 10 and an upper surface bonded to the lower surface of the associated lateral extension 17. Operation of the device will be understood from the discussion of operation of the first embodiment. As in the first embodiment, simultaneous actuation of the piezoelectric actuators 13 will rotate the column of the rotation member about its own axis.

Figure 9A:
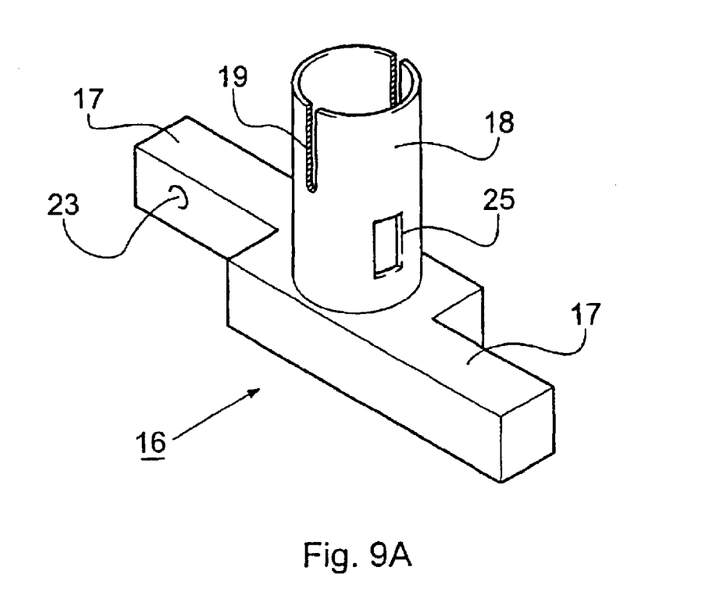
FIGS. 9A and 9B are schematic perspective views of a rotation member and a top plate according to a further embodiment.
Figure 9B:
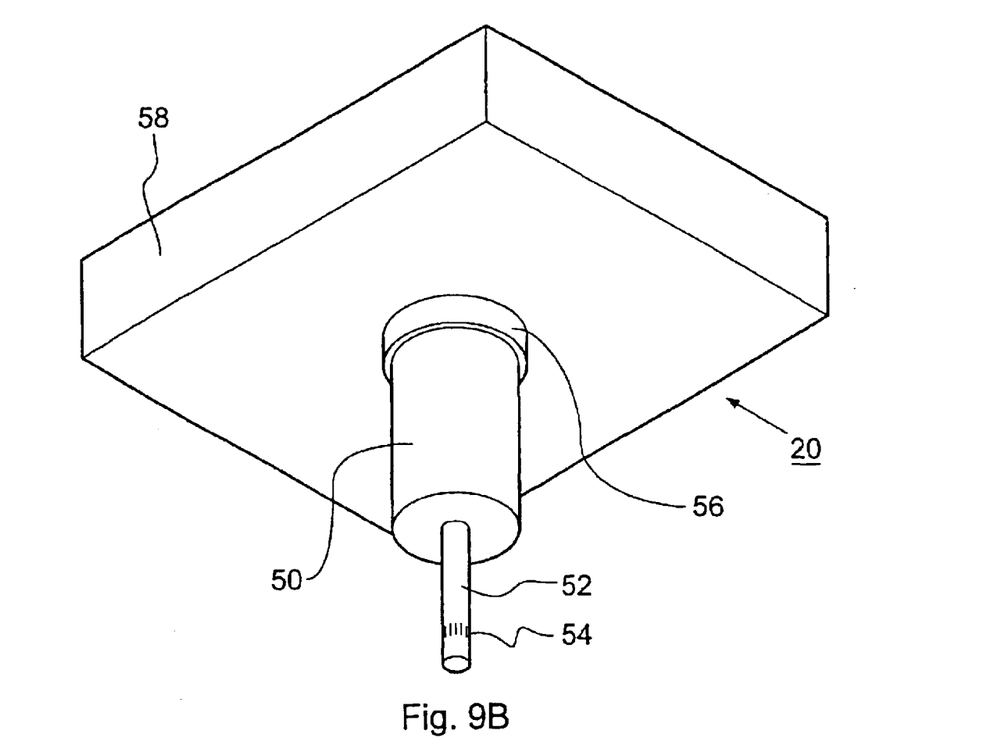

FIGS. 9A and 9B show a rotation member and a top plate according to an inertial rotation device of a further embodiment. The base plate and piezoelectric actuators are the same as those from the embodiment of FIG. 7.

Referring to FIG. 9B, the rotation member 16 has a lower part comprising lateral extensions 17 and conical recesses 23 identical to that of the embodiment of FIG. 7. However, the rotation member has a column 18 which is different from that of the previously described embodiment. The column has the form of a hollow shaft with two vertical slits 19 extending down from an upper rim of the column through the walls of the hollow column 18 and arranged circumferentially opposite to each other on the upper rim. This arrangement provides a spring so that a further shaft closely fitted into the hollow shaft is gripped with a clamping force.

With reference to FIG. 9A, the top plate 20 comprises and upper platform 58 on which an object may be mounted for rotation from which there extends a downwardly depending shaft having a thicker upper portion 56, a central portion 50 for frictionally engaging into the hollow column 18, and a thinner lower extension 52 provided with vertical stripe marks 54 for encoder feedback. The thicker upper portion 56 serves to provide an abutment lip for preventing the top plate from sliding down along the rotational axis during use. The central portion 50 has an outer diameter dimensioned in relation to the inner diameter of the hollow column 18 to provide a desired clamping force for the slip-stick frictional engagement. Thus, the frictional engagement is formed between an inner surface of the column and an outer surface of the top plate, which contrasts with the previous embodiments in which the frictional engagement is formed between an outer surface of the column and an inner surface of the top plate. Moreover, the clamping action is provided by the rotation member, instead of by the top plate as in the previous embodiments.

The materials for the engaging surfaces of the parts 50 and 18 can be chosen so that any wear predominantly occurs in the top plate part 50. This is advantageous, since the top plate is easily replaced and can be treated as a consumable if necessary.

An advantage of this embodiment is that the driven part, i.e. the rotation member, can be made light without compromising stability. Moreover, any mechanical losses that may result from relative motion between the two top plate parts in the previous embodiments are eliminated.

A further advantage is that the hollow column design is amenable to fitting an encoder for measuring absolute angular position of the top plate. The optional features shown in FIGS. 9A and 9B for the encoding are the lower extension 52 of the top plate 20 that is provided with vertical stripe marks 52 of contrasting reflectivity and a window 25 provided in the wall of the hollow column 18, the window 25 being positioned to be adjacent to the vertical stripe marks 52 in the assembled device. The window 25 is to provide optical access for a conventional optoelectronic emitter and receiver unit (not shown). The optoelectronic emitter and receiver unit can be mounted directly onto the outside of the column 18. The optoelectronic emitter and receiver unit acts as a transducer in a conventional encoder feedback system (not shown) to count the number of vertical stripe marks 52 that are traversed as the top plate is rotated. In this way absolute rotational positioning can be achieved.

It will also be understood that an encoder system may be added to the device of the previous embodiments if desired.

REFERENCES

1. Howald et al, "Piezoelectric inertial stepping motor with spherical rotator" Rev. Sci. Instrum. volume 63, pages 3909–3912 (1992)
2. GB 2 316 222 A (Karrai)
3. EP 0 747 977 A (Minolta)
4. EP 0 675 589 A (Minolta)
5. EP 464 764 A1 (Canon)
6. U.S. Pat. No. 5,410,206 (New Focus)
7. WO 98/19347 A (Zrenner)
8. Renner et al, Rev. Sci. Instrum. volume 61, pages 965–967 (1990)

What is claimed is:

1. An inertial positioning devices, comprising:
    (a) a base plate;
    (b) a top plate to mount an element to be rotated;
    (c) a rotation member having a column on which the top plate is mounted in frictional engagement for slip-stick rotational motion; and
    (d) a pair of piezoelectric actuators, each having first and second ends, the first ends being secured to the base plate and the second ends being secured to the rotation member such that simultaneous actuation of the piezoelectric actuators rotates the column of the rotation member about an axis thereof,
    wherein simultaneous actuation of the piezoelectric actuators causes lengthwise extension or contraction thereof.

2. A device according to claim 1, wherein the piezoelectric actuators are cantilevered out from their first ends and suspend the rotation member above the base plate by their second ends.

3. A device according to claim 1, wherein the piezoelectric actuators are arranged to contact the rotation member with their second ends at substantially equal distances from the axis of rotation and on opposite sides of the column.

4. A device according to claim 1, wherein the top plate and the column are structured and arranged to inhibit motion of the top plate along the rotation axis.

5. A device according to claim 1, wherein the top plate comprises first and second parts connected to each other by a resilient biasing mechanism that defines a clamping farce for the frictional engagement between the top plate and the column.

6. A device according to claim 5, wherein the resilient biasing mechanism is adjustable to vary the clamping force.

7. A device according to claim 1, wherein the frictional engagement is formed between an outer surface of the column and an inner surface of the top plate.

8. A device according to claim 1, wherein the frictional engagement is formed between an inner surface of the column and an outer surface of the top plate.

9. An inertial positioning device, comprising:
   (a) a base plate;
   (b) a top plate to mount an element to be rotated;
   (c) a rotation member having a column on which the top plate is mounted in frictional engagement for slip-stick rotational motion; and
   (d) a pair of piezoelectric actuators, each having first and second ends, the first ends being secured to the base plate and the second ends being secured to the rotation member such that simultaneous actuation of the piezoelectric actuators rotates the column of the rotation member about an axis thereof,
   wherein simultaneous actuation of the piezoelectric actuators causes shear deformation thereof.

10. A device according to claim 9, wherein the piezoelectric actuators are arranged under the rotation member and suspend the rotation member above the base plate.

11. A device according to claim 9, wherein the piezoelectric actuators are arranged to contact the rotation member with their second ends at substantially equal distances from the axis of rotation and on opposite sides of the column.

12. A device according to claim 9, wherein the top plate and the column are structured and arranged to inhibit motion of the top plate along the rotation axis.

13. A device according to claim 9, wherein the top plate comprises first and second parts connected to each other by a resilient biasing mechanism that defines a clamping force for the frictional engagement between the top plate and the column.

14. A device according to claim 13, wherein the resilient biasing mechanism is adjustable to vary the clamping force.

15. A device according to claim 9, wherein the frictional engagement is formed between an outer surface of the column and an inner surface of the top plate.

16. A device according to claim 9, wherein the frictional engagement is formed between an inner surface of the column and an outer surface of the top plate.

17. An inertial positioning device, comprising:
   (a) a base plate;
   (b) a top plate to mount an element to be rotated;
   (c) a rotation member having a column on which the top plate is mounted in frictional engagement for slip-stick rotational motion; and
   (d) a pair of piezoelectric actuators, each having first and second ends, the first ends being secured to the base plate and the second ends being secured to the rotation member such that simultaneous actuation of the piezoelectric actuators rotates the column of the rotation member about an axis thereof,
   wherein the top plate comprises first and second parts connected to each other by a resilient biasing mechanism that defines a clamping force for the frictional engagement between the top plate and the column.

18. A device according to claim 17, wherein the top plate and the column are structured and arranged to inhibit motion of the top plate along the rotation axis.

19. A device according to claim 17, wherein the resilient biasing mechanism is adjustable to vary the clamping force.

20. A device according to claim 17, wherein the frictional engagement is formed between an outer surface of the column and an inner surface of the top plate.

21. A device according to claim 17, wherein the frictional engagement is formed between an inner surface of the column and an outer surface of the top plate.

22. An inertial positioning device, comprising:
   (a) a base plate;
   (b) a top plate to mount an element to be rotated;
   (c) a rotation member having a column on which the top plate is mounted in frictional engagement for slip-stick rotational motion; and
   d) a pair of piezoelectric actuators, each having first and second ends, the first ends being secured to the base plate and the second ends being secured to the rotation member such that simultaneous actuation of the piezoelectric actuators rotates the column of the rotation member about an axis thereof,
   wherein the frictional engagement is formed between an outer surface of the column and an inner surface of the top plate.

23. A device according to claim 22, wherein the top plate and the column are structured and arranged to Inhibit motion of the top plate along the rotation axis.

24. An inertial positioning device, comprising:
   (a) a base plate;
   (b) a top plate to mount an element to be rotated;
   (c) a rotation member having a column on which the top plate is mounted in frictional engagement for slip-stick rotational motion; and
   (d) a pair of piezoelectric actuators, each having first and second ends, the first ends being secured to the base plate and the second ends being secured to the rotation member such that simultaneous actuation of the piezoelectric actuators rotates the column of the rotation member about an axis thereof,
   wherein the frictional engagement is formed between an inner surface of the column and an outer surface of the top plate.

25. A device according to claim 24, wherein the top plate and the column are structured and arranged to inhibit motion of the top plate along the rotation axis.

* * * * *